(12) United States Patent
Tong et al.

(10) Patent No.: US 6,722,466 B1
(45) Date of Patent: Apr. 20, 2004

(54) ACOUSTIC BLANKET FOR MACHINERY AND METHOD FOR ATTENUATING SOUND

(75) Inventors: Wei Tong, Clifton Park, NY (US); Thomas Arthur Wagner, Troy, NY (US); Ian Arthur Hughes, Clifton Park, NY (US); John Michael Gillivan, Albany, NY (US); James Joseph Gibney, III, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/265,405

(22) Filed: Oct. 7, 2002

(51) Int. Cl.[7] .................. G10K 11/04; G10K 11/00; E04B 1/82; B41J 29/08; H02K 5/24
(52) U.S. Cl. .................. 181/200; 181/205; 181/290; 181/201; 181/202
(58) Field of Search ................ 181/200, 201, 181/202, 205, 290, 284, 287

(56) References Cited

U.S. PATENT DOCUMENTS

| | | | | |
|---|---|---|---|---|
| 3,534,828 A | * | 10/1970 | Iver | 181/204 |
| 3,700,068 A | * | 10/1972 | Francis | 181/200 |
| 3,860,085 A | * | 1/1975 | Gilbert et al. | 181/205 |
| 3,881,569 A | * | 5/1975 | Evans, Jr. | 181/200 |
| 3,905,444 A | * | 9/1975 | Evans, Jr. | 181/200 |
| 3,951,228 A | * | 4/1976 | Schnell | 181/200 |
| 4,088,157 A | * | 5/1978 | Chen et al. | 139/1 R |
| 4,167,598 A | * | 9/1979 | Logan et al. | 428/34.1 |
| 4,265,277 A | * | 5/1981 | Baumann et al. | 139/1 R |
| 4,442,585 A | * | 4/1984 | McGehee et al. | 29/432 |
| 4,630,416 A | * | 12/1986 | Lapins et al. | 52/239 |
| 5,123,874 A | * | 6/1992 | White, III | 454/251 |
| 5,274,200 A | * | 12/1993 | Das et al. | 181/202 |
| 5,454,611 A | * | 10/1995 | Wanat | 294/24 |
| 5,929,394 A | * | 7/1999 | Westerbeke, Jr. | 181/204 |
| 6,223,903 B1 | * | 5/2001 | Mansouri | 206/600 |
| 6,244,377 B1 | * | 6/2001 | Iwanami | 181/200 |
| 6,318,295 B1 | * | 11/2001 | Wade | 119/500 |

FOREIGN PATENT DOCUMENTS

CA   2214302 A  *  2/1998  ............. E04B/1/84

OTHER PUBLICATIONS

"Environmental Noise Control", ATCO Noise Management, pp. 1–61.
"Built for Sound: Northland Power", ATCO Noise Management, pp. 1–4.
"On Noise Generation and Abatement in Gas Turbine Installations", Lotton et al, pp. 1–16.
GE Industrial Systems, "Series 9000 Large Synchronous Machines", pp. 1–12.

* cited by examiner

Primary Examiner—Robert Nappi
Assistant Examiner—Patrick Miller
(74) Attorney, Agent, or Firm—Nixon & Vanderhye, P.C.

(57) ABSTRACT

An acoustic blanket is disclosed for an industrial machine including a plurality of flexible panels, wherein each panel includes at least one layer of a fiber glass material, an outer casing of a chemically resistant material and an attachment for connecting the panel to an adjacent panel, and the plurality of flexible panels are each assigned a position in said blanket corresponding to a location on the industrial machine.

29 Claims, 5 Drawing Sheets

ACOUSTIC BLANKET FOR MACHINERY AND METHOD FOR ATTENUATING SOUND

BACKGROUND OF THE INVENTION

This invention relates to sound attenuation, and specifically to the reduction of machinery noise levels through use of acoustic blankets.

Growing environmental sound concerns and recognition that lengthy, unprotected exposure to high industrial noise levels can be detrimental to people have resulted in increased attention to reducing industrial noise. In many countries, particularly those in Europe, the allowable maximum noise levels that workers should be exposed to is regulated by law, through government promulgation of noise level criteria.

Recent years have seen the enactment of stringent regulatory requirements for acceptable noise levels for industrial machinery such that increasingly lower noise levels are being required. Because of the increased awareness of the harmful effects from high industrial noise levels and government regulations that establish acceptable noise levels in the work place, noise reduction has become an integral part of machinery safety. Noise abatement is a concern with, for example, generator-steam and gas turbine power plants. As demands for electricity increase, the power industry faces increasing challenges to build and operate efficient and quiet power generators, e.g. steam turbines, gas turbines, and electrical generators.

In an industrial environment, the types of equipment used often emits noise levels that register at high and potentially harmful decibel levels. In a power plant, noise may come from a variety of machine sources, such as generators, gas or steam turbines, fans, pumps, coolers, and other mechanical and electrical equipment, many of which may be in operation simultaneously. Individuals working in such an environment are often faced with the need to reduce the near and far field machinery noise levels. In an environment where individuals work in close proximity to the source(s) of machine noise, near field sound levels must be controlled in order to comply with noise regulating and avoid hearing damage to the workers. Where machine noise can reach areas that are near an industrial plant, it may be prudent to abate far field machine noise to acceptable levels and to avoid broadcasting neighboring communities.

There are several conventional methods available to reduce generator noise levels. These methods are handicapped by one shortcoming or another. Generally, all are overly costly. In one technique, a noise control housing enclosure covers the generator in its entirety. The cost for this enclosure is excessive. In another technique, barrier walls around a power generator constructed from steel are used to reduce generator noise. Such walls are built around the generator, leaving the top open. The cost for this type of noise reduction treatment is also expensive.

SUMMARY OF THE INVENTION

In a first embodiment, the invention is an acoustic blanket for an industrial machine comprising: a plurality of flexible panels, wherein each panel includes at least one layer of a fiber glass material, an outer casing of a chemically resistant material and an attachment for connecting the panel to an adjacent panel, and said plurality of flexible panels are each assigned a position in said blanket corresponding to a location on the industrial machine.

In a second embodiment, the invention is a system for reducing the sound in an industrial machine comprising: an acoustic blanket further comprising a quilt of interconnected flexible panels, wherein each panel includes at least one layer of a sound adsorbing material, an outer casing of a chemically resistant material and an attachment for connecting the panel to at least one adjacent panel, wherein each of said panels bears an indicia indicating a position of the panel in said blanket, and a securing device extending over said blanket to hold the blanket onto said machine.

In a third embodiment, the invention is a method for installing an industrial acoustic blanket on an industrial machine comprising: (a) forming flexible panels wherein each panel includes at least one layer of a sound adsorbing material, an outer casing of a chemically resistant material, and an attachment for connecting the panel to at least one adjacent panel; (b) marking each of said panel with an indicia indicating a position of the panel in said blanket corresponding to a location on the industrial machine; (c) positioning each of said panels the corresponding location of said industrial machine using the indicia to determine the proper location of the panel on the machine; (d) attaching the panels to adjacent panels of the blanket, and (e) securing the blanket to the machine.

DETAILED DESCRIPTION OF THE INVENTION

Figure 1:
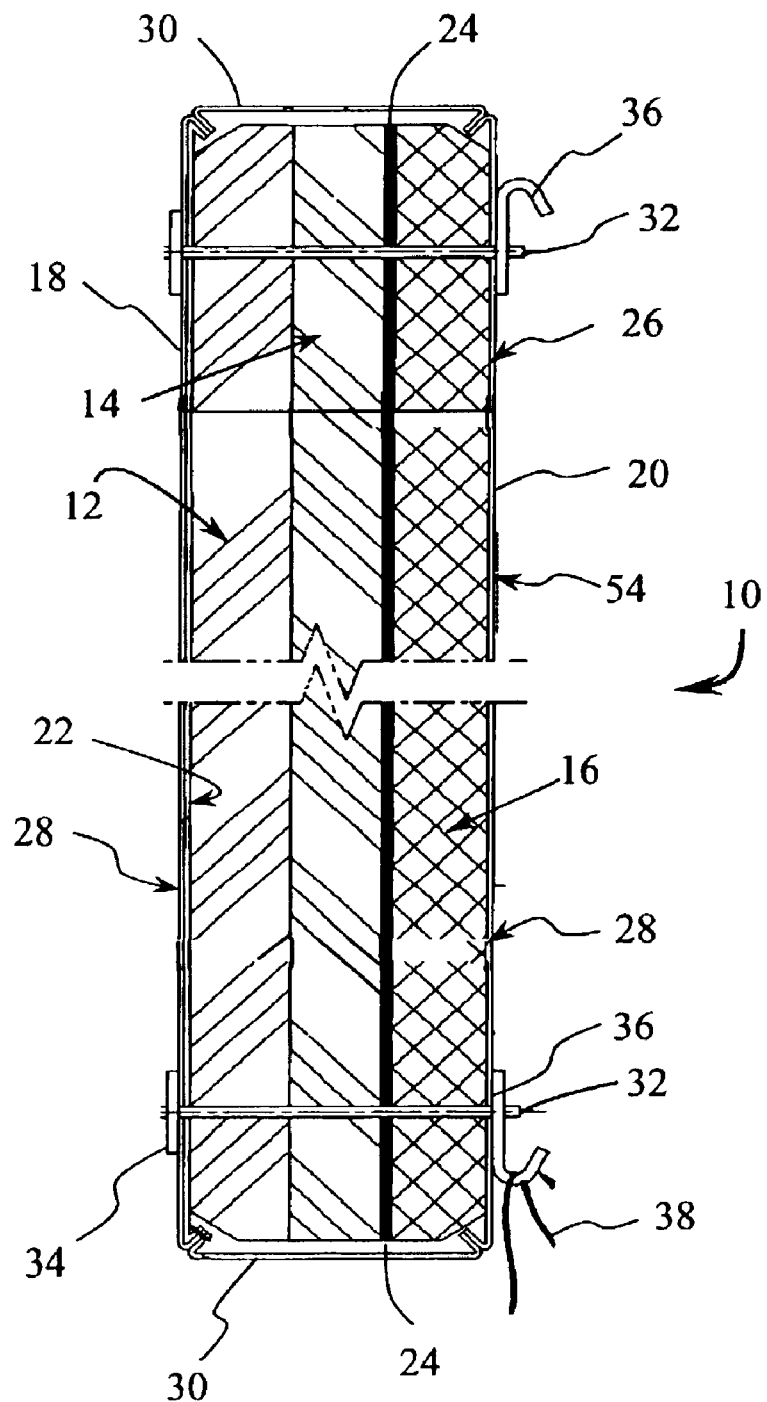
FIG. 1 illustrates a cross-section of one embodiment of an acoustic blanket section.

FIG. 1 illustrates a cross-section of one embodiment of an acoustic blanket section 10. The acoustic blanket is a quilt of flexible panels 10. Each panel may have a generally rectangular shape at the main generator body surface, such as 5 meters in length and 6 meters in height, or fan shape at the generator side surfaces. However, the shape of the panel may be tailored to conform to the outer shape of the portion of the machine that the blanket is intended to cover. The thickness of a panel may be in an exemplary range of 5 to 12 centimeters. These dimensions are exemplary. The actual dimensions of a particular acoustic blanket will depend on its application. Moreover, the actual shape of the acoustic blanket may also vary from application to application.

As shown in FIG. 1, the acoustic panel 10 may be formed of a single or multi-fiberglass layers that have good acoustic damping properties. By way of example, the acoustic panel may include two high density fiberglass layers 12 and 14, and a low density fiberglass layer 16, encapsulated with silicon coated fabric or polytetrafluoroethylene (PTFE) sheets 28. It is preferable that the low density layer 16, be positioned in the acoustic panel towards the outer surface 20 of the panel and, away from the hot machine. The high density fiberglass layers 12 and 14 may be positioned towards the machine and towards the inner surface 18 of the panel. The high density fiberglass layers 12 and 14 have generally better heat tolerance properties than does the low density fiberglass layer 16.

Each panel 10 may include a structural support layer 24, which may be formed of a mass loaded vinyl material. The structural support material 24 carries much of the lateral load applied to the acoustic blanket. The structural layer 24 is flexible, as in the entire panel 10. A purpose of the structural layer 24 is to carry any load which might be otherwise applied to the fiberglass layers 12, 14 and 16. Whereas the fiberglass layers provide the good sound absorbing properties, these fiberglass layers tend not to provide strong structural support and may tear apart when placed under tensile stress. Accordingly, a structural support layer 24 carries the tensile loads that may otherwise damage the sound absorbing layers of the acoustic panel. In addition, the structure layer 24 may further reduce noise intensity.

An outer casing 26 provides a chemically resistant enclosure for the fiberglass and structural support layers of the panel. The outer casing 26 may be formed of front and back sheets 28 of PTEE or silicon rubber coated fabric sections. In addition, the casing 26 may include side sections at the top and ends of the acoustic panel 10 which are also formed of PTEE or silicon. rubber boated fabric sections 30. The fabric sections are secured together, e.g., by stitching, to provide a fabric casing for the fiberglass and structural support layers within the acoustic blanket. The fabric casing 26 may include an end clamp to allow access for the removal of one or more of the inner layers of the panel. At the panel inner surface 18 which is in contact with the hot wall of the machine, an additional fabric section 22 may be used to attach with the section 28 inside the casing 26 for further reducing sound intensity and temperature.

The acoustic panel 10 and its layers may be held together by tie rods 32 which extend through the panel. The tie rode 32 may include an inner washer 34 and an outer washer and hook 36. The outer washer and hook 36 may be secured by annealed stainless steel wires 38 to adjacent panels and their respective hooks. The wires hold adjacent panels together to form the acoustic blanket.

Figure 2:
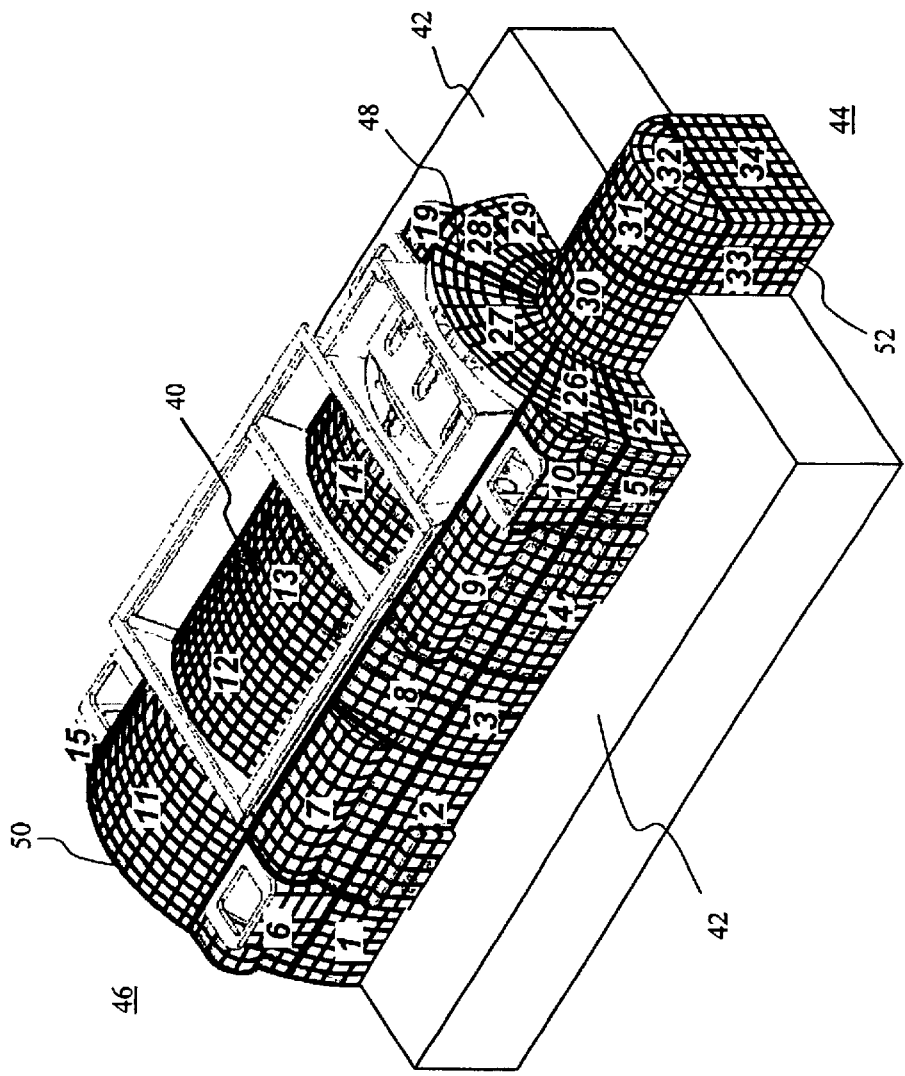
FIG. 2 illustrates a generator that is covered with an acoustic blanket.

FIG. 2 is a perspective view of a generator 40. The acoustic panels are arranged side by side and top to bottom form a blanket covering the generator. The shape of each panel may be specifically designed to fit the surface of the location corresponding to the panel location of the particular generator that the blanket is intended to cove. For example, a particular panel may be shaped as a half-cylinder to cover a protruding portion of the machine. Further, the panels may be prominently numbered so that operators may have an instruction manual for the acoustic blanket, which identifies where each numbered panel 10 is to be applied to the generator. As the panels 10 are applied to the generator, wiring or cabling 38 may be used to secure the panels to each other by looping the wiring around the hooks 36 on adjacent panels.

The generator 40 in FIG. 2 has a collect end (CE) 44 and a turbine end (TE) 46. At the collect end 44, an enclosure 52 ("dog house"), containing the generator accelerator, is attached to the side surface 48. Results from field measurements show that the enclosure 52 is generally the highest noise source during generator normal operation. In order to reduce SPL effectively, the acoustic blanket used to cover the enclosure may be specifically designed, for instance, using more high density fiberglass layers or large size of acoustic panels for reducing seams. At the turbine end 46, the generator is coupled with a steam turbine via a coupling. If an enclosure is used to cover the coupling, no blanket is required on the TE end surface 50. Otherwise, a blanket is needed to cover the TE end surface 50 in a similar pattern on the CE end surface 48.

Figure 3:
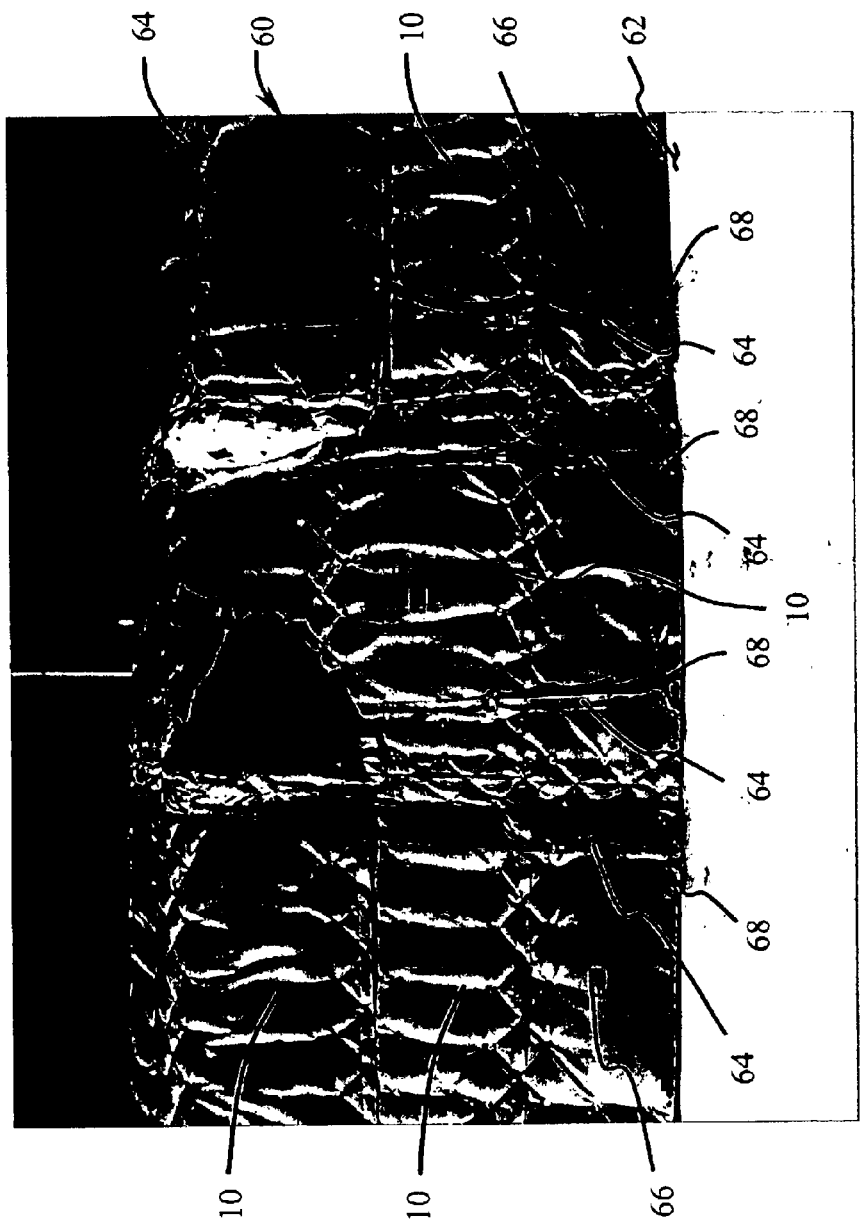
FIG. 3 illustrates a method of installing an acoustic blanket.

FIG. 3 is an illustration of an acoustic blanket 60 on a generator (hidden under the generator skirt). The acoustic blanket is formed by the quilt of panels 10. The outer washer and hook 36 can be seen in the illustration. The position on the panel of the tie rod and associated washer and hook 36 may vary with different acoustic panel designs.

To ensure the blanket remains secured to the generator, straps 64 may extend around the acoustic blanket and attached to a base 62 of the generator. Tie-down brackets 68 may be provided on the base 62 for the straps. Each strap 64 may extend from one side of the generator, over the top of the acoustic blanket, and to the other side of the generator where it is tied down to the base 62 on a tie down bracket 68 at the other side of the generator. The straps ensure that the acoustic blankets do not become dislodged from the generator due to high winds or other weather conditions.

Figure 4:
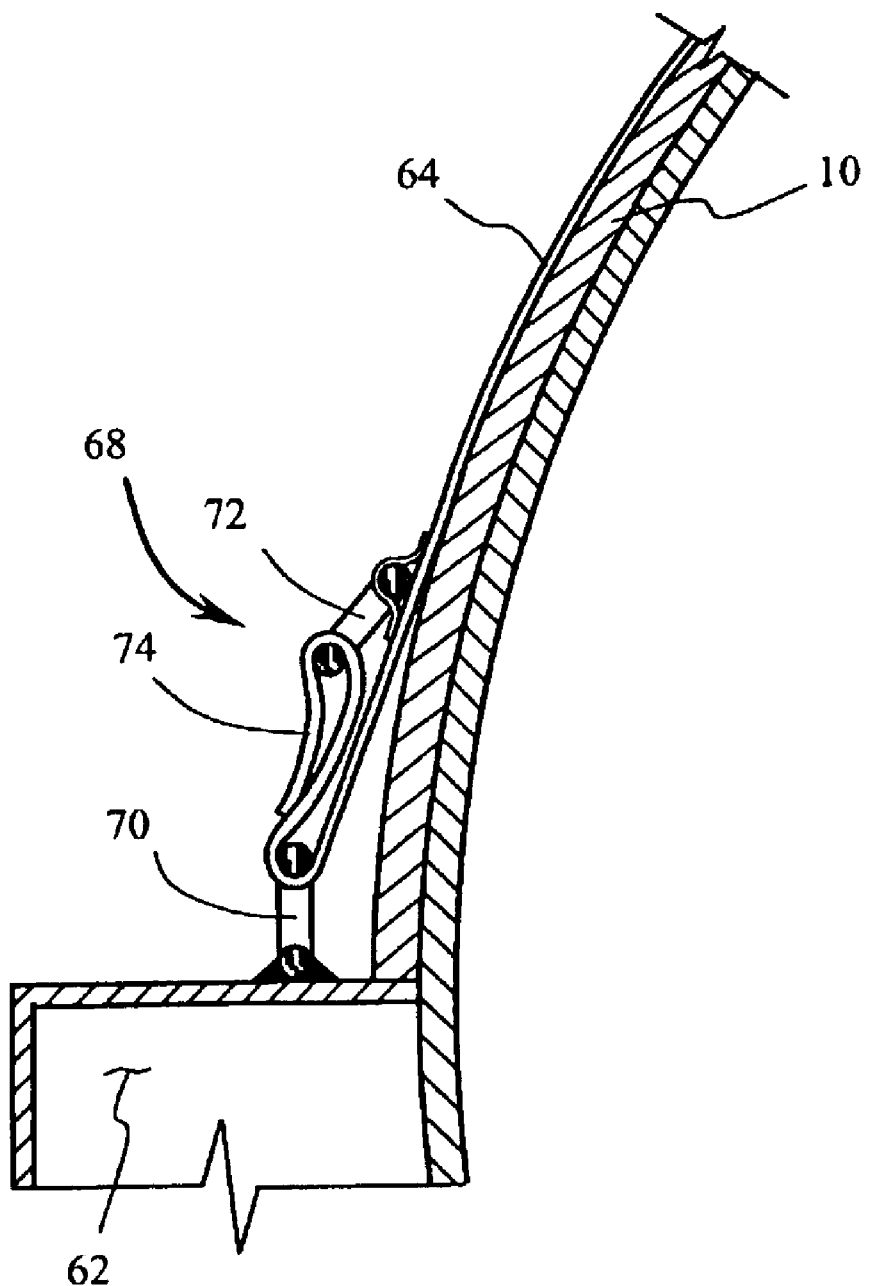
FIG. 4 is a side view of a side section of an acoustic blanket and tie-down strap.

FIG. 4 is an exemplary tie down bracket 68. The tie down bracket may include a rectangular or hemispheric ring 70 that is pivotably attached to the acoustic blanket to the base 62 of the generator. The strap 64 for the acoustic blanket may loop through the rectangular or hemispheric ring 70, and loop back over a rectangular ring 52 on the strap. By double looping the end of the strap 64 through rings 70, 72 and securing the end 74 of the strap, the strap can be secured to the tie down bracket 68 and tightly cinched to the acoustic blanket 10.

The straps may be formed of stainless steel jacketing having a nominal thickness of 0.7 mm. The tie down brackets may use stainless steel buckles and strikers to secure the strap to the base 62 of the generator. Other materials such as nonmetallic materials can be also used to make straps 64. As do the acoustic panels, the straps may have identification number to assist operators determine where each strap should be positioned along the acoustic blanket and generator As an alternative to using straps 64, a stainless steel mesh may be incorporated as an additional layer 54 on each panel 10 of the acoustic blanket. The stainless steel mesh protects the blanket from abrasion and also from operators who walk across the blanket while the blanket is on the generator or is in storage.

The acoustic blankets may be attached to the generator frame by several methods in addition to the tie down brackets shown in FIG. 4. For example, the generator frame may be modified to include various welded nuts at appropriate positions to couple with bolts that extend from the panel, such as bolted tie rods 32 into the nuts on the generator. Similarly, nails may be welded directly to the generator frame wall using a capacitor discharge stud welder. The nails extend through the acoustic panels and secure the acoustic panel to the generator.

Further, the panels may be assembled on the generator and connected by the hooks and wires 36, 38. To secure the assembled blanket to the generator, stainless steel bands around the circumference of the generator may be applied and tightened with a banding tool. This may be particularly useful for hydrogen cooled generators.

A generator skirt 42 may be applied around a lower circumference of the generator 40, as is shown in FIG. 2. Usually, the skirt 42 is acoustically treated at its interior to reduce the sound pressure level (SPL) from the generator. The acoustic blanket is thus attached to the skirt. An advantage provided by the generator skirt is that noises generated at the generator lower half section could not transmitted to the outside of the generator If a skirt is used, the acoustic blanket need not cover the entire generator, but need only extend to the upper section of the generator.

In order to maximize the reduction of sound pressure levels from the generator, it is highly desired to cover the generator outside surface with blankets as much as possible. However, from the standpoint of cost-effectiveness, an alternative embodiment is to cover only certain particularly noisy sections of the generator. Quieter sections of the generator may be opened and not covered by the blanket.

Figure 5:
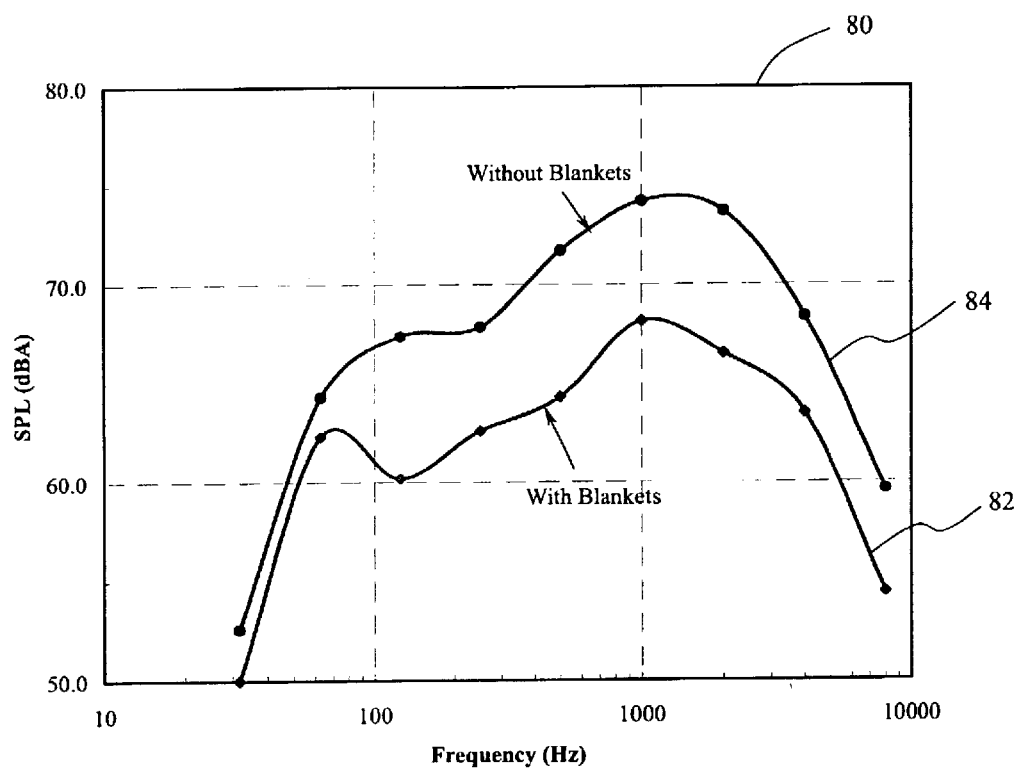
FIG. 5 is a graph showing a reduction of generator sound pressure level (SPL) at different frequencies.

FIG. 5 shows a graph 80 of the sound reduction of a generator due to the use of acoustic blankets. In particular, the graph 80 shows that a generator operating with blankets (see line 82) is substantially quieter than a generator operation without acoustic blankets (see line 84). The graph shows that the sound pressure level (SPL) in decibels is dramatically reduced across most noise frequencies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An acoustic blanket for an industrial machine comprising:
    a plurality of flexible panels, wherein each panel includes at least one layer of a fiber glass material, an outer casing of a chemically resistant material and an attachment for connecting the panel to an adjacent panel, and
    said plurality of flexible panels are each assigned a position in said blanket corresponding to a location on the industrial machine,
    wherein the panels include a tie-rod extending through the panels to secure the panels together.

2. An acoustic blanket as in claim 1 wherein said at least one layer of fiber glass material includes at least one layer of high density fiberglass, and a layer of low density fiber glass.

3. An acoustic blanket as in claim 1 wherein said at least one layer of fiber glass material includes at least two layers of high density fiberglass, and a layer of low density fiber glass.

4. An acoustic blanket as in claim 1 wherein said panel further includes a support layer.

5. An acoustic blanket as in claim 1 wherein said panel further includes a layer of a mass loaded vinyl material.

6. An acoustic blanket as in claim 1 wherein the outer casing are fabric sections of flexible polytetrafluoroethylene or silicon rubber, and said sections are attached to form the casing.

7. An acoustic blanket according to claim 1 wherein at least one of said panels has shape conforming to an outer surface of a portion of the industrial machine corresponding to the location of the panel.

8. An acoustic blanket for an industrial machine comprising:
    a plurality of flexible panels, wherein each panel includes at least one layer of a fiber glass material, an outer casing of a chemically resistant material and an attachment for connecting the panel to an adjacent panel, and
    said plurality of flexible panels are each assigned a position in said blanket corresponding to a location on the industrial machine,
    wherein the panels include a tie-rod extending through the panels to secure the panels together, and the tie-rod further includes one of the attachments.

9. An acoustic blanket for an industrial machine comprising:
    a plurality of flexible panels, wherein each panel includes at least one layer of a fiber glass material, an outer casing of a chemically resistant material and an attachment for connecting the panel to an adjacent panel, and
    said plurality of flexible panels are each assigned a position in said blanket corresponding to a location on the industrial machine,
    wherein the panels include a tie-rod extending through the panels to secure the panels together, and the tie-rod further include the attachments comprising a hook at an end of the tie-rod.

10. An acoustic blanket for an industrial machine comprising:
    a plurality of flexible panels, wherein each panel includes at least one layer of a fiber glass material, an outer casing of a chemically resistant material and an attachment for connecting the panel to an adjacent panel, and
    said plurality of flexible panels are each assigned a position in said blanket corresponding to a location on the industrial machine,
    further comprising cabling between the attachment of adjacent panels, wherein cabling secures the panels together in the blanket.

11. An acoustic blanket according to claim 10 further comprising identification indicia on each of said panels, wherein each indicia identifies the location of the panel within the blanket.

12. An acoustic blanket for an industrial machine comprising:
    a plurality of flexible panels, wherein each panel includes at least one layer of a fiber glass material, an outer casing of a chemically resistant material and an attachment for connecting the panel to an adjacent panel, and
    said plurality of flexible panels are each assigned a position in said blanket corresponding to a location on the industrial machine,
    further including at least one external strap extending over the blanket and the machine and secured at opposite ends of the strap to a machine base, wherein each end of the strap is secured to opposite sides of the machine.

13. An acoustic blanket according to claim 12 wherein the outer casing includes a top cover of steel mesh.

14. An acoustic blanket according to claim 12 wherein the blanket partially covers the machine.

15. An acoustic blanket for reducing the sound in an industrial machine comprising:
    an acoustic blanket further comprising a quilt of interconnected flexible panels, wherein each panel includes at least one layer of a sound adsorbing material, an outer casing of a chemically resistant material and an attachment for connecting the panel to at least one adjacent panel, wherein each of said panels bears an indicia indicating a position of the panel in said blanket, and
    a securing device extending over said blanket to hold the blanket onto said machine,
    wherein the panels include a tie-rod extending through the panels to secure the panels together, and the tie-rod further includes a hook at an end of the tie-rod for connecting the panel to an adjacent panel.

16. An acoustic blanket as in claim 15 wherein said at least one layer of sound adsorbing material includes at least one layer of high density fiberglass, and a layer of low density fiber glass.

17. An acoustic blanket as in claim 15 wherein said at least one layer of sound adsorbing material includes at least two layers of high density fiberglass, and a layer of low density fiber glass.

18. An acoustic blanket as in claim 15 wherein said panel further includes a support layer.

19. An acoustic blanket as in claim 15 wherein said panel further includes a mass loaded vinyl material.

20. An acoustic blanket as in claim 15 wherein the outer casing are sections of flexible polytetrafluoroethylene or silicon rubber, and said sections are attached to form the casing.

21. An acoustic blanket according to claim 15 wherein at least one of said panels has shape conforming to an outer surface of a portion of the industrial machine corresponding to the location of the panel.

22. An acoustic blanket for reducing the sound in an industrial machine comprising:

an acoustic blanket further comprising a quilt of interconnected flexible panels, wherein each panel includes at least one layer of a sound adsorbing material, an outer casing of a chemically resistant material and an attachment for connecting the panel to at least one adjacent panel, wherein each of said panels bears an indicia indicating a position of the panel in said blanket, and a securing device extending over said blanket to hold the blanket onto said machine, further comprising cabling between adjacent panels, wherein the cabling secures the panels together in the blanket.

23. An acoustic blanket for reducing the sound in an industrial machine comprising:

an acoustic blanket further comprising a quilt of interconnected flexible panels, wherein each panel includes at least one layer of a sound adsorbing material, an outer casing of a chemically resistant material and an attachment for connecting the panel to at least one adjacent panel, wherein each of said panels bears an indicia indicating a position of the panel in said blanket, and a securing device extending over said blanket to hold the blanket onto said machine, further comprising a skirt around a lower section of the machine, wherein the skirt is attached along a bottom edge to a machine base and is attached along an upper edge to said blanket.

24. A method for installing an industrial acoustic blanket on an industrial machine comprising:

a) forming flexible panels wherein each panel includes at least one layer of a sound adsorbing material, an outer casing of a chemically resistant material, and an attachment for connecting the panel to at least one adjacent panel;

b) marking each of said panel with an indicia indicating a position of the panel in said blanket corresponding to a location on the industrial machine;

c) positioning each of said panels the corresponding location of said industrial machine using the indicia to determine the proper location of the panel on the machine;

d) attaching the panels to adjacent panels of the blanket, e) securing the blanket to the machine;

f) attaching said plurality of blanket sections to said industrial machine, wherein said blanket substantially conforms to an outer shape of the industrial machine when laying on said machine, and wherein steps (a) to (e) are performed sequentially.

25. A method for installing an industrial acoustic blanket on an industrial machine comprising:

a) forming flexible panels wherein each panel includes at least one layer of a sound adsorbing material, an outer casing of a chemically resistant material, and an attachment for connecting the panel to at least one adjacent panel;

b) marking each of said panel with an indicia indicating a position of the panel in said blanket corresponding to a location on the industrial machine;

c) positioning each of said panels the corresponding location of said industrial machine using the indicia to determine the proper location of the panel on the machine;

d) attaching the panels to adjacent panels of the blanket, and e) securing the blanket to the machine, f) attaching said plurality of blanket sections to said industrial machine, wherein steps (c) and (d) are performed in reverse order.

26. A method for installing an industrial acoustic blanket on an industrial machine comprising:

a) forming flexible panels wherein each panel includes at least one layer of a sound adsorbing material, an outer casing of a chemically resistant material, and an attachment for connecting the panel to at least one adjacent panel;

b) marking each of said panel with an indicia indicating a position of the panel in said blanket corresponding to a location on the industrial machine;

c) positioning each of said panels the corresponding location of said industrial machine using the indicia to determine the proper location of the panel on the machine;

d) attaching the panels to adjacent panels of the blanket, and e) securing the blanket to the machine, f) attaching said plurality of blanket sections to said industrial machine, wherein step (d) is performed by attaching the panels edge to edge, and applying cabling between the adjacent panels to secure the panels together.

27. A method as in claim 26 wherein the blanket is secured to the machine by straps extending over the blanket and machine and secured at opposite ends to a machine base.

28. A method for installing an industrial acoustic blanket on an industrial machine comprising:

a) forming flexible panels wherein each panel includes at least one layer of a sound adsorbing material, an outer casing of a chemically resistant material, and an attachment for connecting the panel to at least one adjacent panel;

b) marking each of said panel with an indicia indicating a position of the panel in said blanket corresponding to a location on the industrial machine;

c) positioning each of said panels the corresponding location of said industrial machine using the indicia to determine the proper location of the panel on the machine;

d) attaching the panels to adjacent panels of the blanket, and e) securing the blanket to the machine, f) attaching said plurality of blanket sections to said industrial machine, wherein the blanket is secured to the machine by at least one strap extending over the blanket and machine, and secured at opposite ends to a machine base.

29. A method for installing an industrial acoustic blanket on an industrial machine comprising:

a) forming flexible panels wherein each panel includes at least one layer of a sound adsorbing material, an outer casing of a chemically resistant material, and an attachment for connecting the panel to at least one adjacent panel;

b) marking each of said panel with an indicia indicating a position of the panel in said blanket corresponding to a location on the industrial machine;

c) positioning each of said panels the corresponding location of said industrial machine using the indicia to determine the proper location of the panel on the machine;

d) attaching the panels to adjacent panels of the blanket, and e) securing the blanket to the machine, f) attaching said plurality of blanket sections to said industrial machine, wherein the blanket is secured to the machine by at least one strap extending around the blanket and machine, and securing a bottom edge of the blanket to a skirt wrapped around a lower section of the machine.

* * * * *